(12) United States Patent
Courth et al.

(10) Patent No.: US 12,344,204 B2
(45) Date of Patent: Jul. 1, 2025

(54) VALVE ARRANGEMENT

(71) Applicant: Continental Teves AG & Co. OHG, Frankfurt am Main (DE)

(72) Inventors: Christian Courth, Frankfurt (DE); Heiko Gensert, Eppstein (DE); Daniel Cvetanovic, Rodgau (DE); Ralf Kaiser, Mainz-Kastel (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 64 days.

(21) Appl. No.: 17/780,229

(22) PCT Filed: Nov. 10, 2020

(86) PCT No.: PCT/EP2020/081678
§ 371 (c)(1),
(2) Date: May 26, 2022

(87) PCT Pub. No.: WO2021/104856
PCT Pub. Date: Jun. 3, 2021

(65) Prior Publication Data
US 2023/0016695 A1    Jan. 19, 2023

(30) Foreign Application Priority Data
Nov. 26, 2019    (DE) .................... 10 2019 218 229.1

(51) Int. Cl.
*B60T 11/232*    (2006.01)
*B60T 11/228*    (2006.01)
*B60T 13/74*    (2006.01)

(52) U.S. Cl.
CPC ........... *B60T 11/232* (2013.01); *B60T 11/228* (2013.01); *B60T 13/745* (2013.01)

(58) Field of Classification Search
CPC ....... B60T 11/228; B60T 11/232; B60T 3/745
See application file for complete search history.

(56) References Cited

U.S. PATENT DOCUMENTS 3,556,615 A    1/1971  Stelzer
5,209,553 A    5/1993  Burgdorf et al.
(Continued)

FOREIGN PATENT DOCUMENTS

CN    101084142 A    12/2007
CN    102481914 A    5/2012
(Continued)

OTHER PUBLICATIONS

German Search Report dated Sep. 24, 2020 for the counterpart German Patent Application No. 10 2019 218 229.1.
(Continued)

*Primary Examiner* — Kenneth Bomberg
*Assistant Examiner* — Daniel S Collins

(57) ABSTRACT

A valve arrangement is inserted between a master brake cylinder and a reservoir in a housing of an electrohydraulic motor vehicle brake system which can be activated both by a vehicle driver and independently of the vehicle driver. The valve arrangement can be acted on by a volume flow which can be conveyed by a linear actuator in the direction of a pedal travel simulator, the working chamber of the pedal travel simulator being connected to the master brake cylinder, wherein, for the purpose of simplified construction and actuation, the valve arrangement has a hydraulically actuable non-return valve and a fixed orifice arranged parallel to the non-return valve. The non-return valve is arranged together with the fixed orifice in a valve carrier which is fastened to a closure plug which closes the housing of the motor vehicle brake system.

10 Claims, 2 Drawing Sheets

(56) References Cited

U.S. PATENT DOCUMENTS

| | | | |
|---|---|---|---|
| 5,647,644 A * | 7/1997 | Volz | B60T 8/3675 |
| | | | 303/119.2 |
| 2012/0169112 A1 | 7/2012 | Jungbecker et al. | |
| 2012/0228925 A1 | 9/2012 | Baechle et al. | |
| 2014/0144732 A1 | 5/2014 | Bayer et al. | |
| 2015/0035353 A1 | 2/2015 | Drumm | |
| 2018/0141529 A1 | 5/2018 | Brok et al. | |

FOREIGN PATENT DOCUMENTS

| | | |
|---|---|---|
| CN | 103502066 A | 1/2014 |
| DE | 3912935 A1 | 12/1990 |
| DE | 102008001061 A1 | 10/2009 |
| DE | 102009018789 A1 | 10/2010 |
| DE | 102012222897 A1 | 8/2013 |
| DE | 102013216314 A1 | 2/2015 |
| DE | 102016222845 A1 | 5/2018 |
| KR | 101622146 B1 | 5/2016 |
| WO | 2015022264 A1 | 2/2015 |

OTHER PUBLICATIONS

The International Search Report and the Written Opinion of the International Searching Authority mailed on Jan. 15, 2021 for the counterpart PCT Application No. PCT/EP2020/081678.

Chinese Notice of Allowance issued on Apr. 25, 2023 for the counterpart Chinese Patent Application No. 202080079272.9 and DeepL Translation of same.

Korean Office Action dated Oct. 31, 2023 for the counterpart Korean Patent Application No. 10-2022-7015927 and translation of same.

* cited by examiner

VALVE ARRANGEMENT

CROSS-REFERENCE TO RELATED APPLICATION

This U.S. patent application claims the benefit of PCT patent application No. PCT/EP2020/081678, filed Nov. 10, 2020, which claims the benefit of German patent application No. 10 2019 218 229.1, filed Nov. 26, 2019, both of which are hereby incorporated by reference.

TECHNICAL FIELD

The invention relates to a valve arrangement for an electrohydraulic motor vehicle brake system.

BACKGROUND

An electrohydraulic motor vehicle brake system with a manually actuable master brake cylinder, a pressure medium reservoir, an electrically actuable inlet and outlet valve for each wheel brake for setting wheel-specific brake pressures, an electrically controllable linear actuator for pressurizing the wheel brakes in the "brake-by-wire" operating mode, a pedal travel simulator which can be hydraulically acted on by the master brake cylinder and gives the vehicle driver a defined brake pedal feel in the "brake-by-wire" operating mode, and an electromagnetically actuable valve arrangement is provided between the master brake cylinder and the reservoir.

Therefore, a valve arrangement of the specified type using means which are as simple, inexpensive and functionally reliable as possible, without the need for electromagnetic actuation is useful.

BRIEF SUMMARY

A valve arrangement is inserted between a master brake cylinder and a reservoir in a housing of an electrohydraulic motor vehicle brake system which can be activated both by a vehicle driver and independently of the vehicle driver, wherein the valve arrangement can be acted on by a volume flow which can be conveyed by a linear actuator in the direction of a pedal travel simulator, the working chamber of the pedal travel simulator are connected to the master brake cylinder. The valve arrangement has a hydraulically actuable non-return valve and a fixed orifice arranged parallel to the non-return valve, wherein the non-return valve is arranged together with the fixed orifice in a valve carrier which is fastened to a closure plug which closes the housing of the motor vehicle brake system.

BRIEF DESCRIPTION OF THE DRAWINGS

Further features will become apparent below from the description of several exemplary embodiments with reference to drawings, in which.

DETAILED DESCRIPTION

Figure 1:
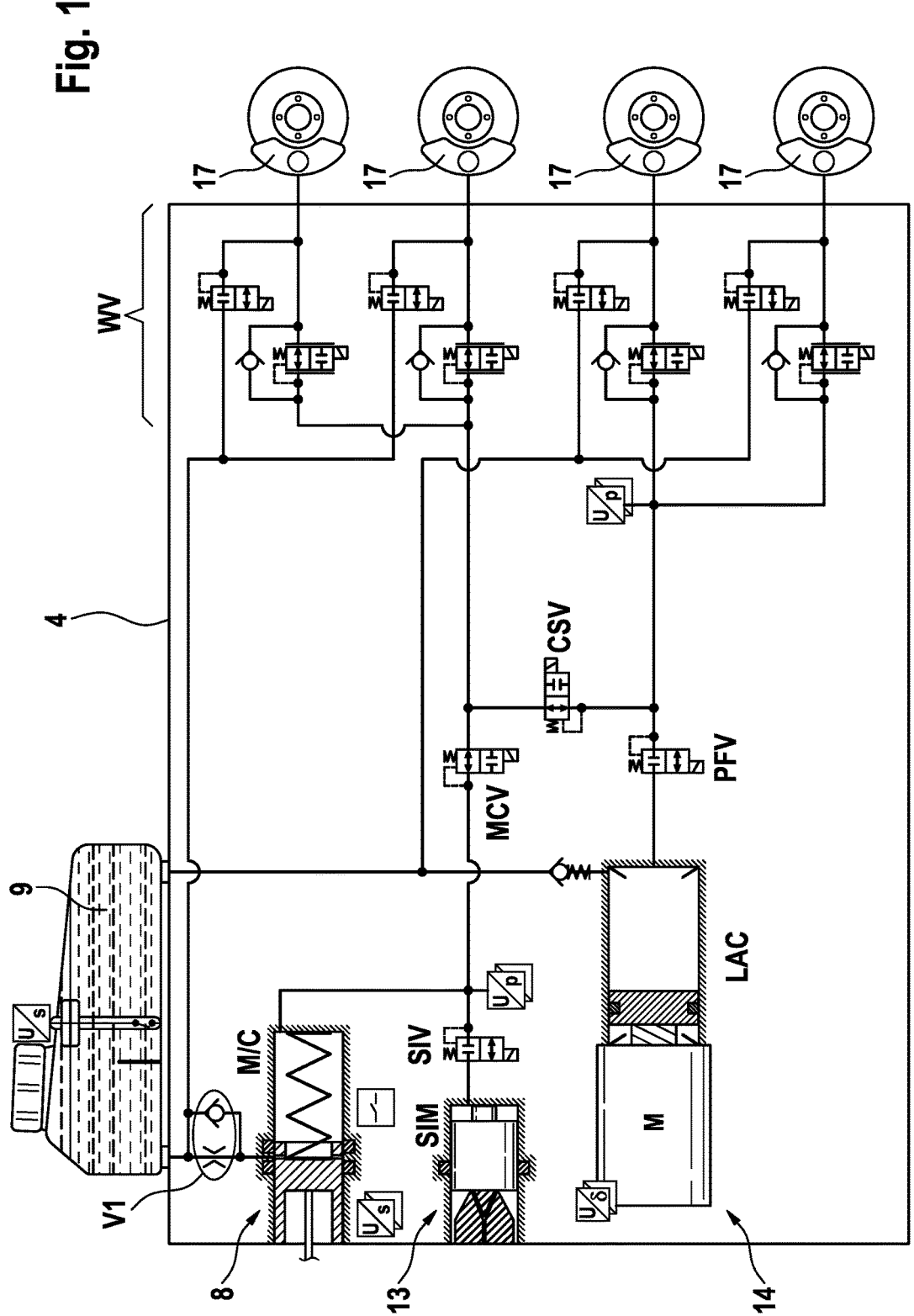
FIG. 1 shows a schematic representation of the hydraulic circuit structure for an electrohydraulic brake system which is provided with a newly designed valve arrangement.

FIG. 1 shows a basic representation of the valve arrangement V1 which is inserted between a master brake cylinder 8 and a reservoir 9 of an electrohydraulic motor vehicle brake system.

The motor vehicle brake system can be activated independently of the vehicle driver owing to the use of a pedal travel simulator 13 connected to the master brake cylinder 8 and the connection of a linear actuator 14 between the reservoir 9 and the wheel brakes 17, wherein, for the purpose of diagnosing the brake system, the valve arrangement V1 can be acted on by a volume flow which can be conveyed by the linear actuator 14 in the direction of the pedal travel simulator 13, the working chamber of the pedal travel simulator being connected to the master brake cylinder 8 via an electromagnetically actuable simulator valve SIV.

The desired varied operating modes of the brake system can be implemented by means of further solenoid valves MCV, CSV, PFV, which are arranged upstream of the wheel pressure control valves WV of the wheel brakes 17.

The so-called fallback level of the brake system can be tested by means of the valve arrangement V1, for which purpose a defined volume flow is conveyed by the linear actuator 14 into the working chamber of the pedal travel simulator 13. This takes place under the condition that the return flow from the master brake cylinder 8 in the direction of the reservoir 9 is significantly reduced at least by the build-up of a back pressure, which is why the valve arrangement V1 has a fixed orifice 2 arranged parallel to a non-return valve 1.

A dynamic pressure of defined magnitude can therefore be generated in the direction of the reservoir 9 by means of the fixed orifice 2, this ensuring that the pedal travel simulator 13 is filled with the volume flow generated by the linear actuator 14, while, on the other hand, unrestricted throughflow is established exclusively from the reservoir 9 to the master brake cylinder 8 by the non-return valve 1 as required for supplying pressure as quickly as possible. In order to ensure the fixed orifice function, however, the throughflow is in principle blocked by means of the non-return valve 1 in the opposite direction.

Figure 2:
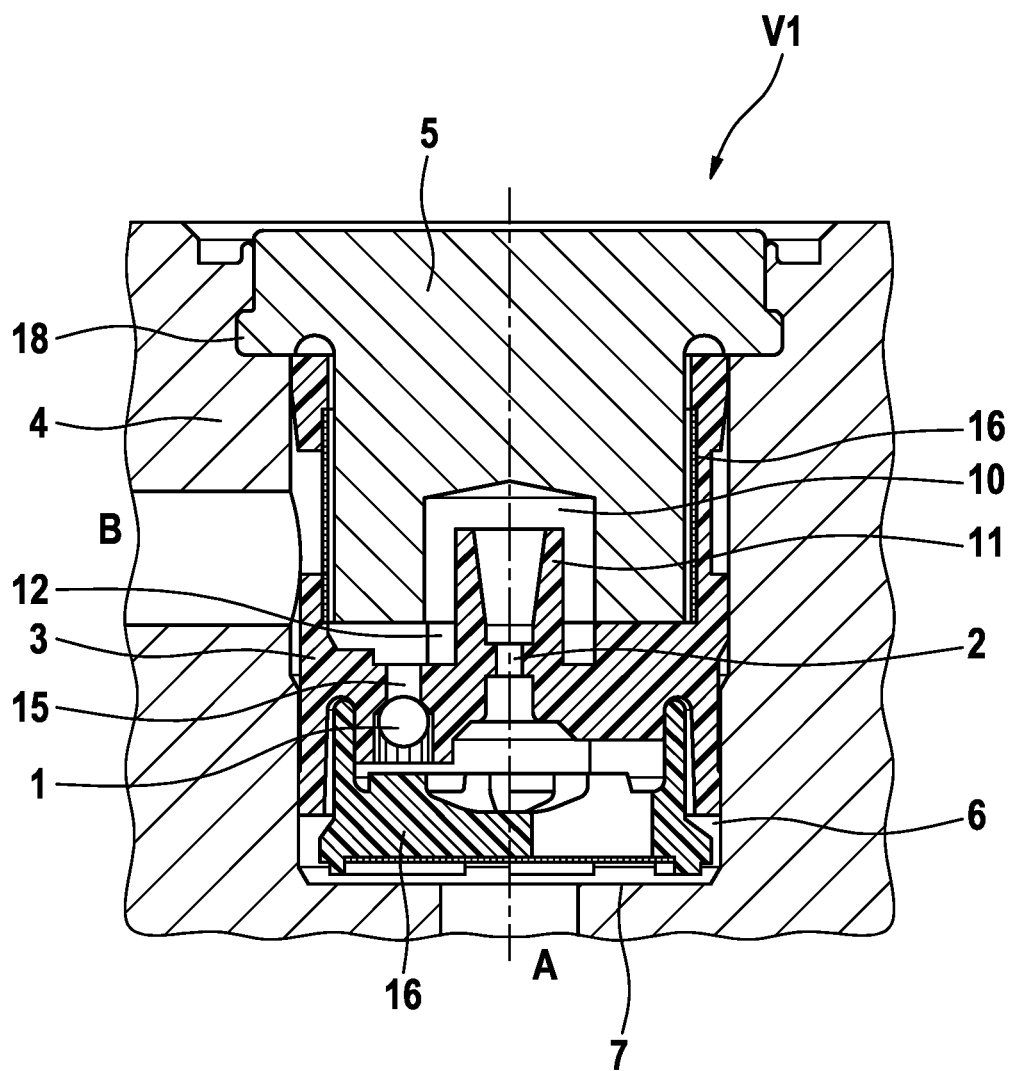
FIG. 2 shows, in longitudinal section, a schematic detail of the electrohydraulic brake system for illustrating the structural design of the valve arrangement.

As can be seen from FIG. 2, the non-return valve 1 is arranged together with the fixed orifice 2 in a valve carrier 3 which is fastened with a compact design to a closure plug 5 which closes the housing 4 of the motor vehicle brake system.

This ensures that, after the valve carrier 3 has been pressed onto the closure plug 5, an independently handleable assembly which can be pre-tested with regard to the function of the fixed orifice 2 and the non-return valve 1 and can be fixed into a blind hole 6 in the housing 4 with minimal effort is produced.

As can be seen from FIG. 2, a first channel A which is arranged in the housing 4 and is connected to the master brake cylinder 8 shown in FIG. 1 opens into the bottom 7 of the blind hole 6. Furthermore, a second channel B which is arranged in the housing 4 and is connected to the reservoir 9 known from FIG. 1 opens into the lateral surface of the blind hole 6.

The design results in a compressed footprint in the vertical direction since the closure plug 5 has a recess 10 in the direction of the valve carrier 3, into which recess a sleeve projection 11 of the valve carrier 3, which sleeve projection comprises the fixed orifice 2, extends in sections, wherein a cavity 12 is provided between the valve carrier 3 and the closure plug 5 to establish a pressure medium connection between the first and the second channel A, B, so that, depending on the direction of throughflow, the two channels A, B can be connected to one another in a particularly simple manner via the fixed orifice 2 and/or the non-return valve 1.

When viewed together with FIG. 1, a dynamic pressure of defined magnitude can therefore be generated in the direction of the reservoir 9 using the illustrated fixed orifice 2, this ensuring that the pedal simulator 13 is filled with the volume flow generated by the linear actuator 14, while unrestricted throughflow from the reservoir 9 to the master brake cylinder 8 is possible by way of the non-return valve 1, but the throughflow is interrupted by the non-return valve 1 in the opposite direction.

For the purpose of structurally optimal positioning of all the components, the sleeve projection 11 comprising the fixed orifice 2 is arranged on the axis of symmetry of the valve carrier 3 analogously to the recess 10, so that the non-return valve 1 can be arranged next to the sleeve projection 11 in a vertical passage hole 15 in the base 16 of the valve carrier 3 in an expedient manner in terms of flow.

In order to avoid contamination of the fixed orifice 2 and the non-return valve 1, a respective filter element 16 is arranged on the bottom and on the lateral surface of the valve carrier 3. The filter element 16 arranged on the bottom of the valve carrier 3 covers the non-return valve 1 at an axial distance which is smaller than the dimensions of the non-return valve 1, this reliably preventing the spherical non-return valve 1 from falling out under all operating conditions.

The valve carrier 3 may be produced from a plastic by injection molding and the closure plug 5 is preferably produced from an aluminum alloy by cold extrusion, with the feature that the annular filter fabric of the filter element 16 can be inserted and overmolded in one operation during the production of the valve carrier 3.

The required sealing of the valve carrier 3 within the blind hole 6 is ensured by a radial press connection at the end region of the valve carrier 3. Similarly, the closure plug 5, in the region of its collar 18, is fixed in the blind hole 6 in a pressure medium-tight manner by externally calking the housing material.

The invention claimed is:

1. An electrohydraulic motor vehicle brake system comprising:
   a reservoir configured to store fluid of the electrohydraulic motor vehicle brake system;
   a master brake cylinder; and
   a valve arrangement coupled between the master brake cylinder and the reservoir, the valve arrangement comprising an assembly of:
      a closure plug, wherein the closure plug comprises a recess extending in a vertical direction of the closure plug;
      a valve carrier fastened to the closure plug, the valve carrier comprising:
         a non-return valve configured to supply pressure via flow of the fluid from the reservoir to the master brake cylinder and block pressure via flow of the fluid from the master brake cylinder to the reservoir; and
         a fixed diaphragm configured to control pressure in the electrohydraulic system via flow of the fluid, wherein the non-return valve and the fixed diaphragm are connected in parallel between the master brake cylinder and the reservoir; and
      a sleeve projection extending in a vertical direction of the valve carrier and extending into the recess of the closure plug the sleeve projection including the fixed diaphragm; and
      a cavity of the assembly disposed between the valve carrier and the closure plug, the cavity configured to establish a pressure medium connection between the master brake cylinder and the reservoir.

2. The valve system as claimed in claim 1, wherein the valve carrier comprises a vertical passage hole,
   wherein the non-return valve is disposed in the vertical passage hole,
   wherein the sleeve projection is arranged on a vertical axis of symmetry of the valve carrier, and
   wherein the non-return valve is disposed adjacent to the sleeve projection in the vertical passage hole.

3. The electrohydraulic motor vehicle brake system according to claim 2, wherein the cavity is configured to establish the pressure medium connection between the master brake cylinder via the first channel and the reservoir via the second channel.

4. The valve system as claimed in claim 1, wherein the valve carrier is plastic and the closure plug is an aluminum alloy.

5. The electrohydraulic motor vehicle brake system according to claim 1, further comprising a housing,
   wherein the closure plug is configured to close the housing of the electrohydraulic motor vehicle brake system.

6. The electrohydraulic motor vehicle brake system as claimed in claim 5, wherein the housing comprises a blind hole, and
   wherein the assembly of the valve carrier fastened to the closure plug is disposed in the blind hole.

7. The electrohydraulic motor vehicle brake system as claimed in claim 6, wherein the housing comprises:
   a first channel coupled to a first opening of the blind hole, the first channel connected to the master brake cylinder; and
   a second channel coupled to a second opening of the blind hole, the second channel connected to the reservoir.

8. The electrohydraulic motor vehicle brake system according to claim 7, wherein the first opening comprises an opening at a bottom of the blind hole and the second opening comprises an opening at a lateral surface of the blind hole.

9. The valve system as claimed in claim 8, further comprising:
   a first filter element arranged at the bottom of the blind hole; and
   a second filter element arranged at the lateral surface of the blind hole.

10. The valve system as claimed in claim 9, wherein the filter element covers the non-return valve at an axial distance smaller than a dimension of the non-return valve.

* * * * *